United States Patent
Mathieu et al.

[15] 3,668,620
[45] June 6, 1972

[54] METHOD AND APPARATUS FOR DETERMINATION OF SEISMIC SIGNAL EVENT COHERENCE

[72] Inventors: Paul G. Mathieu, Pittsburgh, Pa.; Paul V. Lindblade, Ponca City, Okla.

[73] Assignee: Continental Oil Company, Ponca City, Okla.

[22] Filed: July 25, 1969

[21] Appl. No.: 844,893

[52] U.S. Cl. ........... 340/15.5 CC, 340/15.5 CC, 340/15.5 TC
[51] Int. Cl. ........................................................ G01v 1/28
[58] Field of Search ............ 340/15.5 CC, 15.5 MC, 15.5 TC, 340/15.5 TD

[56] References Cited

UNITED STATES PATENTS

| | | | |
|---|---|---|---|
| 2,946,044 | 7/1960 | Bolgiano et al. | 340/174 |
| 3,133,254 | 5/1964 | Lindsay et al. | 328/104 |
| 3,134,957 | 5/1964 | Foote et al. | 340/15.5 |
| 3,323,105 | 5/1967 | Charske | 340/15.5 |

FOREIGN PATENTS OR APPLICATIONS 825,131 12/1963 U.S.S.R. ............................. 340/15.5

Primary Examiner—Samuel Feinberg
Assistant Examiner—N. Moskowitz
Attorney—Joseph C. Kotarski, Henry H. Huth, Jerry B. Peterson, William J. Miller, David H. Hill and Craig, Antonelli, Stewart & Hill

[57] ABSTRACT

A method and apparatus for processing multitrace seismic signals to determine the most coherent dip attitude for any selected point in time. The method serves to accentuate similar event signals from a plurality of seismic traces at selected time delays per trace for predetermined time increments along the multi-trace seismic signals. In one form, the dipping event signal accentuating process may be carried out by combining each of the plural traces of selected time delays per trace to derive a plurality of signals each indicative of a selected step-out or dip angle, and thereafter combining the plurality of signals to produce an output signal indicative of the most coherent dip attitude.

12 Claims, 11 Drawing Figures

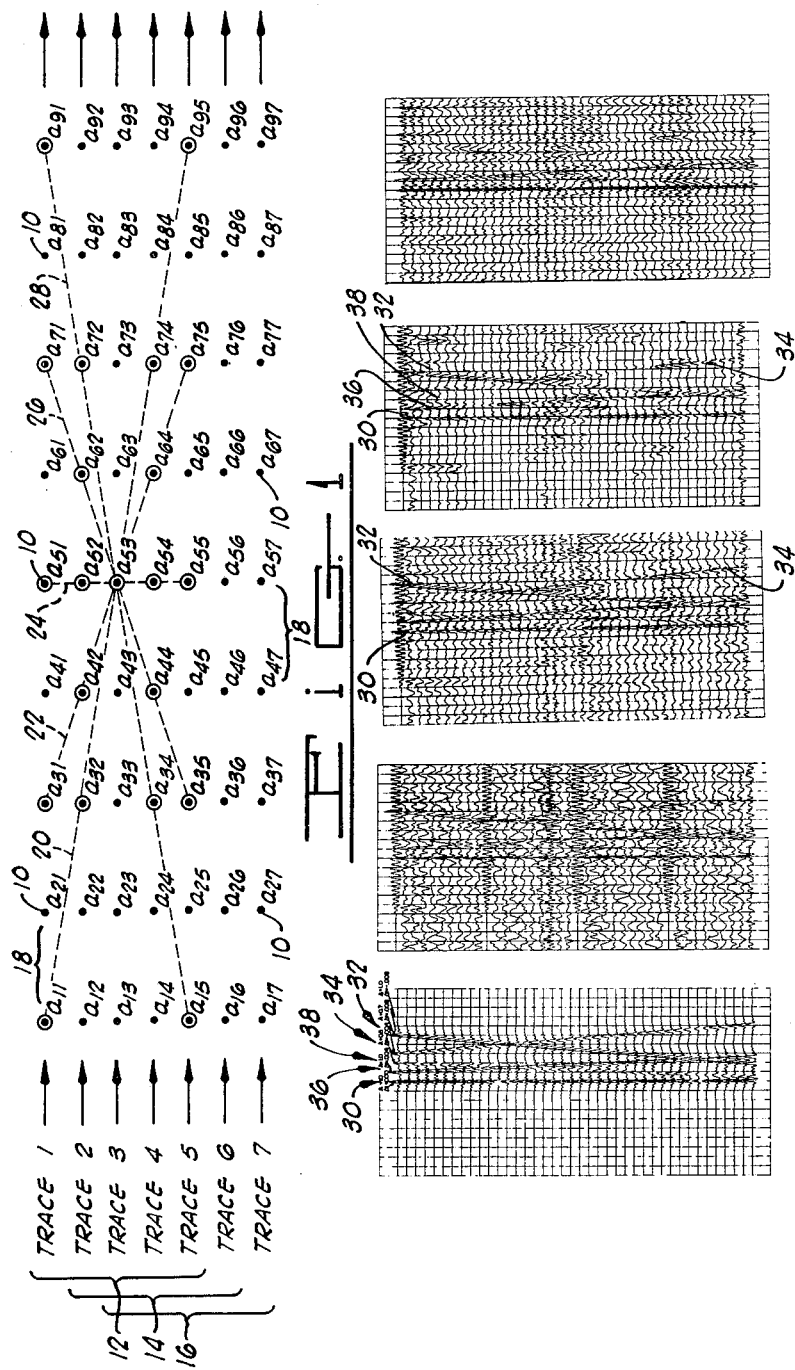

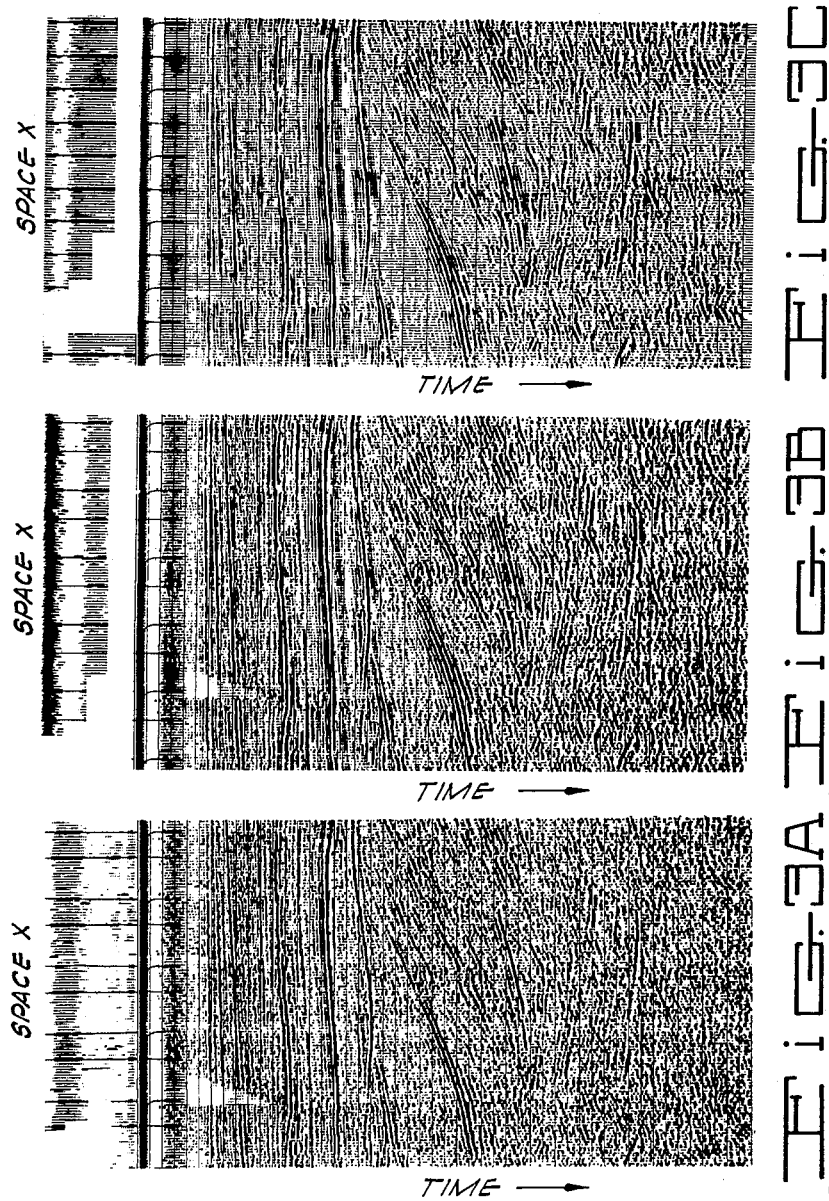

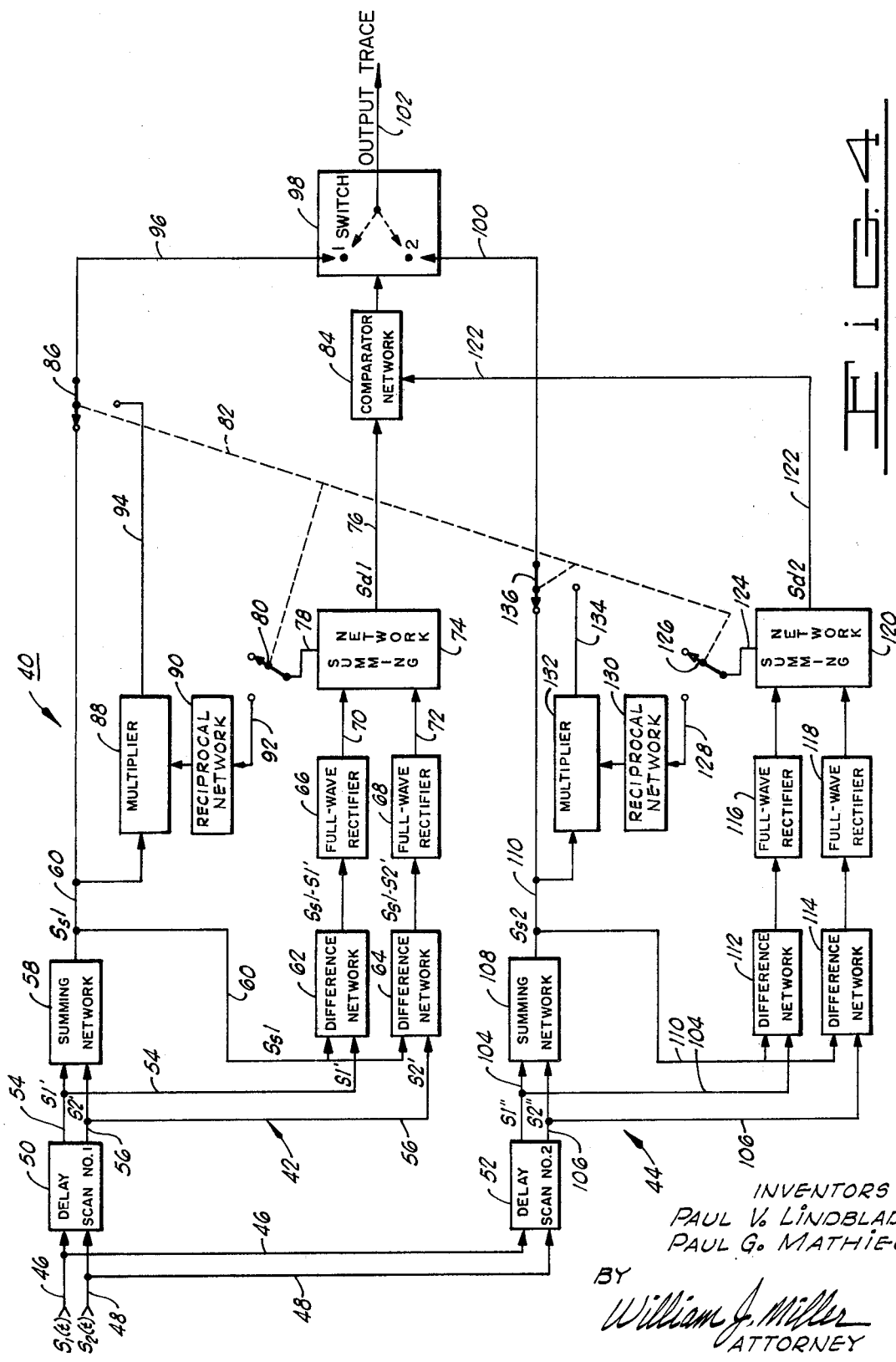

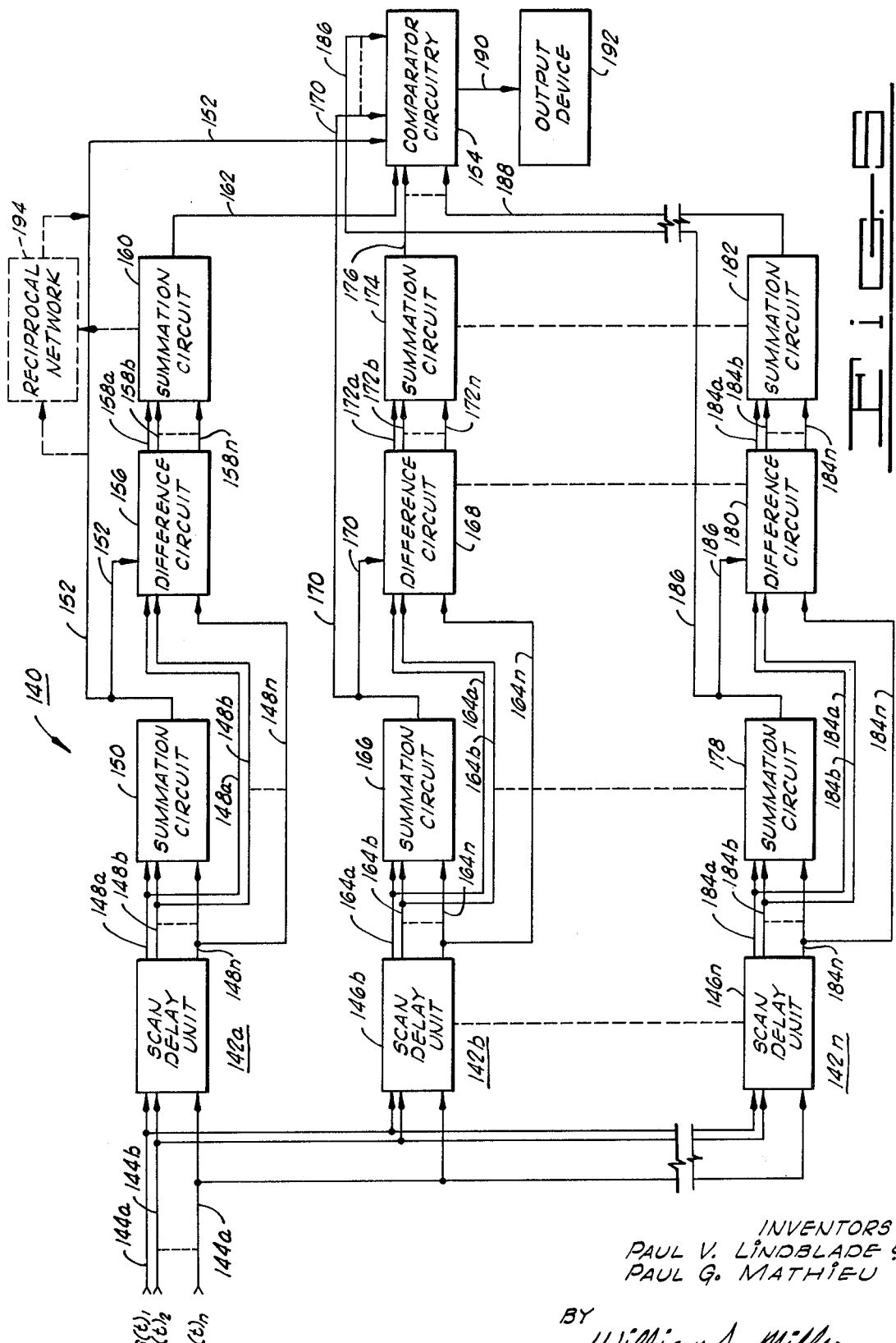

METHOD AND APPARATUS FOR DETERMINATION OF SEISMIC SIGNAL EVENT COHERENCE

BACKGROUND OF THE INVENTION

1. Field of the Invention

The invention relates generally to seismic signal processing method and apparatus and, more particularly, but not by way of limitation, it relates to improved signal processing for use in enhancing the amplitude of coherent dipping events.

2. Description of the Prior Art

The prior art includes various forms of multi-trace seismic signal processing apparatus which is utilized to "clean up" the seismic traces so that useful information is more readily discernible. Such processing is a necessary addendum in the seismic signal acquisition process as the raw or little-refined returned seismic energy is very often masked over by interference, multiples and other sub-surface reflection anomalies such that useful information does not take on desirable or definitive forms in final output presentation. Prior art systems include many applications of such as inverse filtering, velocity filtering, and various other forms of time domain filtering, and these particular types of signal processing are useful in stressing many forms of output information. The present invention is utilized for enhancing signal information of a particular type, i.e. event coherence having a particular time relationship, and this particular type of information has not been available through processing by any of the prior art methods developed or employed to date.

SUMMARY OF THE INVENTION

The present invention contemplates a signal processing system for deriving dipping event information from multi-trace seismic energy return. In a more limited aspect, the invention consists of a method for continuously examining successive seismic data groups of a plural trace seismic signal input, such data groups consisting of time-displaced data values having a constant time difference along each of the plural traces, and combinations of data points adhering to a predetermined time-delay per trace on different ones of plural traces are further processed to enhance the energy signal values existing at the selected time delay per trace. The actual signal enhancement techniques may vary with application and procedure; however, the invention is specifically described herein with respect to the employ of a specific signal combination technique for enhancement of the coherent dip energy values.

Plural trace inputs are scanned at each of a plurality of selected time delays per trace to derive a plurality of delayed trace outputs, and each of the pluralities of delayed trace outputs is then combined to produce an output trace signal. A comparison of the output trace signals can then yield one such trace signal which adheres to predetermined parameter requirements thereby to indicate a maximum coherence of particular dipping events.

Therefore, it is an object of the present invention to provide a signal processing system which is capable of improving signal-to-noise ratio of plural trace seismic information without degradation of dipping events.

It is also an object of the invention to provide an improved seismic signal enhancement process capable of execution by either analog or digital equipmentation.

It is still further an object of the present invention to provide such a system for seismic signal processing wherein subsequent record interpretation is aided by greater exclusion or diminution of unwanted returned signal energy indications.

Finally, it is an object of the present invention to provide a method for compositing seismic traces as derived for consecutive basement points in such a manner that, for any point in time, the most coherent dip attitude may be selected for a composite output indication.

Other objects and advantages of the invention will be evident from the following detailed description when read in conjunction with the accompanying drawings which illustrate the invention.

BRIEF DESCRIPTION OF THE DRAWINGS

FIG. 1 is a representation of a data group of plural data points as it may exist along a plurality of related seismic traces;

FIG. 2A is a representation of one form of multi-trace seismic information;

FIG. 2B represents the event information of FIG. 2A with noise and interference superimposed;

FIG. 2C illustrates one form of processed plural trace output as may be derived from the information represented in FIG. 2B;

FIG. 2D is a second illustration of processed plural trace signal wherein the trace information of FIG. 2B has been coherence stacked, and optional further enhancement is effected by additional coherence gain processing; and FIG. 2E is merely a representation of signal output which may be derived from the plural trace information of FIG. 2B upon undergoing conventional compositing procedure;

FIG. 3A is a replica of actual field data after it has been processed through common depth-point processing of conventional type;

FIG. 3B is a replica of actual field data as derived by coherence stacking of input plural trace data;

FIG. 3C is a replica of actual field data after processing through coherence stacking procedure with the output controlled in accordance with the optional coherence gain factor;

FIG. 4 is a block diagram of one form of analog equipment which is suitable for carrying out the method of the invention; and FIG. 5 is a block diagram of analog equipment for receiving plural input traces for parallel processing and comparison output to a suitable output device.

DETAILED DESCRIPTION OF THE INVENTION

The present method performs a compositing of seismic traces as might be derived from consecutive basement points in such manner that most coherent dip attitude is represented. Such processing can result in improving of the signal-to-noise ratio by enhancement of the amplitude of the coherent events. It is presently anticipated that the process will be used mostly on continuous-profiling reflection data from consecutive basement points of sub-terrain; however, it is also contemplated that various other applications will arise which require specialized treatment of selected seismic data.

The coherence stack process serves to operate on successive data groups equally displaced along a time record of plural trace seismic energy data. The plural traces of data carry a specific interrelationship such as that for each of plural, successive basement points, and these may be either conventionally recorded or they may be compiled through common depth-point (CDP) stacking of data. FIG. 1 represents data groups relative to a plurality of successive related traces 1 through 7. The data groups are each made up of a plurality of successive data sample points 10 for each of a plurality of adjacent traces. The number of traces included in a data group may be varied in accordance with the exigencies of each situation. Thus, the data groups of FIG. 1, are aligned in successive field trace groups as shown by brackets 12, 14 and 16 and each data group is comprised of nine specific data sample points 10, each spaced by a selected, constant time increment 18. In each case, the number of traces utilized is an input variable, as also is the number of dip scans such as are indicated by the dashed scanning lines 20, 22, 24, 26 and 28, as will be further described below.

Individual data sample points within each of data groups 12, 14 and 16 may be identified in accordance with their row and column position in the data group. Thus, the value $a_{ij}$ will allow identification of each data point relative to its data group. Dip coherence may be examined in terms of sample point differences per trace within each data group, the examination being progressive for such data groups along the entire length of the particular set of data traces making up the data group. Thus, successive data group stacking values may be composited from a first plurality of traces, e.g. five successive traces 1 through 5. Next, traces 2 through 6 would be continuously composited in like manner, and, thereafter, traces 3 through 7, traces 4 through 8, etc.

For a given sample point on each trace, a plurality of possible dip scans may be carried out in order to effect the determination of best coherence, which value will then be preserved for the particular sample point. For the data assemblage of FIG. 1, the scans as represented by dash lines 20, 22, 24, 26 and 28 consist of −2, −1, 0, +1, +2 sample increments between traces, respectively. For deriving data relative to the center of the first data group 12, the process derives a best composite for the center most data sample point $a_{53}$. Thus, a first scan (dashed line 20) functioning at −2 samples per trace gives a mean value for $a^1{}_{53}$ or $$\bar{a}_{53}{}^1 = 1/5\ (a_{11} + a_{32} + a_{53} + a_{74} + a_{95}) \qquad (1)$$

We can then compute the sum of the absolute value differences from the mean for the first scan which is $$d_{53}{}^1 = |a_{11} - \bar{a}_{53}{}^1| + |a_{32} - \bar{a}_{53}{}^1| + |a_{53} - \bar{a}_{53}{}^1|$$
$$+ |a_{74} - \bar{a}_{53}{}^1| + |a_{95} - \bar{a}_{53}{}^1| \qquad (2)$$

Similarly, a second scan of the same data group, a scan functioning at the −1 sample per trace as shown by dashed line 22 of FIG. 1, derives the mean differential value as represented by the equations $$\bar{a}_{53}{}^2 = 1/5\ (a_{31} + a_{42} + a_{53} + a_{64} + a_{75}) \qquad (3)$$

$$d_{53}{}^2 = |a_{31} - \bar{a}_{53}{}^2| + |a_{42} - \bar{a}_{53}{}^2| + |a_{53} - \bar{a}_{53}{}^2|$$
$$+ |a_{64} - \bar{a}_{53}{}^2| + |a_{75} - \bar{a}_{53}{}^2| \qquad (4)$$

This same procedure is carried out through the fifth scan to derive the respective mean and differential value along each of the 0, +1 and +2 sample per trace scanning lines, i.e. dashed lines 24, 26 and 28 of FIG. 1.

For the five trace illustration, having derived each of the respective coherence values $d^1{}_{53}$ through $d^5{}_{53}$, we can then compare to establish a minimum $d$ value, this identifying its corresponding mean value $a_m$ as the composite of optimum coherence. At this stage of the process there then exists two options for further enhancement of finally derived coherence dip data. That is, there can be a direct output of the straight composite $a_m$ or there can be further processing with application of a coherence gain factor as derived from a consideration of the sum of the differences to the mean. Thus, in the second case the output values would be equal to $a_m$ for that difference value which is smallest.

Having found a best composite for one point in time, $a_{53}$, the method would then move to the next point in time, $a_{63}$, i.e. the centermost point for the next successive data group along traces 1 to 5. Upon a finding of the composite of best coherence for the data sample point $a_{63}$, the signal enhancement process is repeatedly run at successive points $a_{73}, a_{83}, a_{93}$, and so on to the end of the trace record. Such signal enhancement processing of traces 1 through 5 would serve to derive the best composite for trace three. Thus, with successive processing passes, traces 2 through 6 could derive the best composite for trace 4, traces 3 through 7 would derive the best composite for trace 5, and so on through the processing of all consecutive trace data representations.

FIGS. 2A through 2E show by comparison illustration the use and advantages of the coherence stack process. Thus, and using synthetic or manufactured traces for clarity, FIG. 2A represents several seismic events which have dips ranging from zero time difference for an event 30 to −0.008 seconds delay per trace for an event 32 and, at the other extreme a +0.008 second time delay for an event 34. Also, an event 36 exhibits a 0.004 second time delay per trace while a less-defined event 38 exhibits a −0.004 second time delay per trace.

To further authenticate actual conditions, random noise signals are superimposed upon the event signals of FIG. 2A to derive a seismogram representation such as FIG. 2B. Thus, the trace representations of FIG. 2B include both signal and noise similar to that derived for seismic energy return from a vibrational energy input, e.g. a 5 through 30 cycle per second sweep signal. Inspection of FIG. 2B illustrates the manner in which noise and extraneous return causes severe masking over of the valid event signals such that interpretation is difficult and sometimes impossible.

FIG. 2C shows the resulting trace obtained upon processing the data of FIG. 2B through a first option of the coherence stacking process. In this case, the selected coherence stacking parameters were the utilization of five trace composites having five separate dips scanned for best coherence. Thus, the optimum dip scan time delays would be 0.008/trace, 0.004/trace 0.000/trace, −0.004/trace, and −0.008/trace. These particular parameters provide an optimalized result, but this is best for illustration purposes. As can be noted in FIG. 2C, each of the events, e.g. events 30, 32 and 34 are readily discernible from the output trace data.

FIG. 2D shows still further enhancement upon employ of the second option of the coherence stacking process. That is, the data quality is still more noticably improved by taking the output traces such as are employed in FIG. 2C and applying the coherence gain factor to the mean signal or summation composites. In this instance, the simulated seismic events have been brought out more sharply by applying more relative attenuation to the noise. Thus, each of the events 32 through 38 is still more clearly apparent for interpretative purposes. The seismogram of FIG. 2E is included merely for purposes of comparison as it illustrates a trace output from a conventional type of straight composite. Thus, the seismogram of FIG. 2E would result upon 5/4 (five trace) compositing of the input seismic traces of FIG. 2B. It can be noted that the seismogram of FIG. 2E offers some accentuation of desired events, but it does not approach the clarity of event definition that the first option coherence stack of FIG. 2C, or the second, option coherence stack of FIG. 2D, are able to exhibit.

FIGS. 3A, 3B and 3C illustrate an example of the coherence stack process as used on actual field data. The field data of FIGS. 3A, 3B and 3C represent a cross-sectional profile of a section of sub-terrain wherein the $y$ coordinate is representative of vertical travel time to common depth points and the $x$ coordinate represents space or distance $x$ along the earth's surface. Space $x$ may be adjusted to any distance consonant with a particular profiling process. Thus, FIG. 3A shows the seismic data after it has been processed through a common depth point method, and each of the resulting traces is derived from some order of treatment of the consecutive basement points along the profile. FIG. 3B illustrates the result of processing of the same seismic data of FIG. 3A through the first option of the coherence stacking process. (to be described). That is, the controlling of output trace value by applying the coherence gain factor to the composite of best coherence as will be further described below.

FIG. 4 illustrates one form of apparatus which is suitable for carrying out the coherence stacking process upon input field data. The processing circuitry 40 of FIG. 4 is illustrative of a dual trace processing system which includes processing channel 42 and a processing channel 44. Thus, a pair of input seismic traces $S_1(t)$ and $S_2(t)$, such as may be obtained from adjacent common depth point procedures are applied at respective inputs 46 and 48. Input leads 46 and 48 are connected in parallel to each of a scan No. 1 time delay 50 and a scan No. 2 time delay 52. The delays 50 and 52, which may be conventional types of time delay apparatus capable of adjustment to a preselected time delay increment per trace, are each set in accordance with an expected event dip pattern related to the particular terrain under study. Thus, and referring to FIG. 2A and 2B, an examplary usage may find delay 50 set to effect a .004 second/trace time delay for enhancement through coherence stacking of dip 36, while delay 52 is adjusted to a delay increment of −0.008 secs. per trace to provide coherence determination relative to such as an event 32. It should be understood, of course, that the foregoing comparison to data of FIGS. 2A and 2B is merely for illustration purposes, and the actual delay adjustments will vary with whatever the input data to be processed.

Referring now to processing channel 42, appropriately delayed outputs from delay 50 are present on leads 54 and 56. The outputs S 1' and S 2' on leads 54 and 56 are applied to a summing network 58, a conventional form of algebraic summation circuit, to provide a summed output $S_s1$ on a lead 60. The summation signal $S_s1$ on lead 60 is also applied in parallel to each of a pair of difference network circuits 62 and 64. The time delayed signals S 1' and S 2' are also applied via leads 54 and 56 to the respective difference networks 62 and 64. The difference networks 62 and 64 may be conventional subtraction circuits of a type which is well-known in the art.

The output from difference networks 62 and 64, respective difference signals $S_s1 - S 1'$ and $S_s1 - S 2'$, are then applied to respective full-wave rectifiers 66 and 68 to derive their values in absolute terms. That is, outputs 70 and 72 carry absolute values of the respective difference signals for application to a summing network 74. The output from summing network 74 then constitutes a further difference signal or the mean differential signal which is available for output on a first option output lead 76 as well as a second option output lead 78 to a switch section 80 of an option switch 82. The first option output 76 is connected to a comparator network 84, e.g. a conventional amplitude comparator circuit, as will be further described below.

The sum signal output lead 60 conducts the summed signal $S_s1$ to a switch section 86 of option switch 82 as well as to a multiplier circuit 88 in parallel arrangement. Multiplier 88 may be a conventional form of operational amplifier having its feedback or gain control circuitry regulated by a reciprocal network 90. The reciprocal network 90 receives input via lead 92 from the option switch section 80 which supplies difference signal from the summing network 74.

The reciprocal network 90 may be any of various types of analog stage capable of deriving a reciprocal voltage value relative to its input. For example, it may be an analog/digital type of device as is disclosed in the U.S. Pat. application, Ser. No. 749,723 entitled "Method and Apparatus for Determining and Applying a Gain Function", filed in the name of Sullivan et al., and assigned to the present assignee; or such reciprocal circuitry may take purely analog form, e.g. such as multiplier circuitry operating in conjunction with a function generator, as is disclosed at page 23 of "The Encyclopedia of Electronics", edited by Charles Susskind and published by Reinhold Publishing Corporation. Still other forms of analog circuitry for carrying out the reciprocal function are disclosed at pages 468 through 471 of "Vacuum-Tube and Semiconductor Electronics" by Millman as published by the McGraw-Hill Book Company, Inc.

The output from multiplier 88, the summation signal $S_s1$ is time-varied in accordance with the derived reciprocal from reciprocal network 90, and the time-varied output is supplied on an output lead 94 to the option switch section 86. Thus, when option switch section 86 is thrown to its second option position (opposite from that shown in FIG. 4) the second option of coherence stack processing is exercised as the reciprocal adjusted summation signal is conducted from lead 94 through a conductor 96 to an output switch 98. The output switch 98 receives channel 42 output on lead 96 as well as channel 44 output on lead 100, and a maximum coherence output is selected for final output trace presentation on a lead 102, as will be further described below.

The processing channel 44 functions in like manner to processing channel 42 except that it will be employed to exercise a selected different time delay which, in turn, is representative of a different dip or event time difference. The output from delay 52 is applied via leads 104 and 106 to a summing network 108. These outputs consist of scan No. 2 delayed trace signals S 1'' and S 2'' as prepared for further mean-difference summation through the processing channel 44. Summing network 108 provides a summed signal output $S_s2$ which is present on a lead 110. The summed signal on lead 110 is also applied to each of difference networks 112 and 114 along with respective scan No. 2 delayed signals S 1'' and S 2'' on leads 104 and 106. The outputs from difference networks 112 and 114 then constitute subtractive signals which are conducted through the respective full-wave rectifier stages 116 and 118 such that the values are made absolute for application to summing network 120. The absolute values are summed in summing network 120 and then conducted on a first option output lead 122 to the comparator network 84, as well as on a second option output lead 124 to a switch section 126 of option switch 82.

Upon second option selection, the summed output signal from lead 124 is conducted through lead 128 for input to a reciprocal network 130 which provides a regulating output for gain control of multiplier stage 132. The multiplier stage 132, also operable during the second option switch setting (opposite from that shown) receives input of the summation signal $S_s2$ from lead 110 whereupon it is amplified under control of reciprocal network 130 for output via lead 134 through an option switch section 136 to the lead 100.

The comparator network 84, receiving a differential input $S_d1$ and $S_d2$ from each processing channel 42 to 44 via leads 76 and 122, respectively, makes a comparison of the input voltage to actuate switch 98 in accordance therewith. That is, it compares so that if $S_d1$ (lead 76) is less than or equal to $S_d2$ (lead 122), the comparator network 84 actuates switch 98 to position No. 1, and conversely, if $S_d1$ is greater than $S_d2$, the comparator network 84 will actuate switch 98 to position No. 2.

As for option switching, the first option, with switch setting as shown FIG. 4, will disable the respective reciprocal networks and multipliers 88 and 132 of respective processing channels 42 and 44 such that the output summation signals $S_s1$ and $S_s2$ on leads 60 and 110 are applied directly through respective switch sections 86 and 136 to the No. 1 and No. 2 input positions of switch 98. For second option selection, option switch 82 being reversed, the reciprocal networks and respective multipliers 88 and 132 are brought into play such that the outputs on leads 94 and 134 are applied via leads 96 and 100 to the switch positions of switch 98. In this case, the summation signals $S_s1$ and $S_s2$ on leads 60 and 110 are each, in effect, attenuated inversely as the degree of agreement with their respective mean-differential summations or respective difference signals $S_d1$ and $S_d2$.

FIG. 5 illustrates a coherence stack processing system 140 which consists of a selected number of channels 142a, 142b through 142n for processing a respective plurality of input traces $S(t)_1$, $S(t)_2$, through $S(t)_n$. Input trace signals are applied to respective leads 144a, 144b through 144n for input in parallel to each of the scan delay units 146a, 146b through 146n. Each of the scan delay units 146a, b14 n is adjusted to effect a predetermined time delay per trace to examine for selected dip coherence in accordance with whatever the coherence stacking plan. Thus, a delay of 0.004 seconds/trace may be adjusted between each successive recording channel of the scan delay unit 146a while successively greater or different time delay per trace are adjusted between successive channels of each of the scan delay units 146b through 146n.

Referring now to processing channel 142a, the scan delay unit 146a provides a plurality of time-adjusted outputs 148a, 148b through 148n for parallel input to a summation circuit 150. The summation circuit 150 serves to sum all input values to provide a summed output signal on lead 152. The output on lead 152 is then applied as one input to a comparator circuitry 154. The parallel output leads 148a, b through n are also applied tin parallel to a difference circuit which compares each input to the summation output on lead 152 to provide successive difference signal outputs on respective leads 158a, 158b through 158n for input in parallel to a summation circuit 160. A summed output signal on lead 162 is then applied as a comparator control input via lead 162 to comparator circuitry 154.

Processing channel 142b provides similar, parallel circuitry with scan delay unit 146b providing a plurality of parallel outputs 164a, 164b through 164n for parallel application to each of a summation circuit 166 and a difference circuit 168. A summed output from summation circuit 166 is applied via a lead 170 to comparator circuitry 154, and a parallel disposition of summation circuit on lead 170 is applied to difference circuit 168 for difference comparison with time delay signals on leads 164a, b–n. The output from difference circuit 168 is then a plurality of difference signals on leads 172a, 172b, through 172n for input to a summation circuit 174. The output from summation circuit 174 is then applied as a control input via lead 176 to comparator circuitry 154.

All remaining process channels through channel 142n comprise similar circuitry to that above described for channels 142a and 142b. That is, as is shown for channel 142n, the channel includes a summation circuit 178, difference circuit 180 and another summation circuit 182, each being similarly interconnected as the foregoing like circuitry. Parallel leads 184a, 184b through 184n provide an interconnection of time-delayed signals to each of a summation circuit 178 and difference circuit 180. An output from summation circuit 178 is applied via lead 186 for input to comparator circuitry 154 as well to difference circuit 180, and difference circuit 180 functions to derive difference voltages relative to each of the time-delayed signals for output to the summation circuit 182 which, in turn, provides a control output via lead 188 to the comparator circuitry 154.

Upon selection of an output from comparator circuitry 154, a trace value showing optimum coherence as to dipping events, an output via lead 190 is applied to a suitable output device 192. The output device 192 may be any of various recording or storage devices which are well-known in the geophysical prospecting and seismic interpretation arts. Also, first option only having been shown in FIG. 5, it should be understood that the second options are available for each of the outputs from the respective summation circuits 150, 166 and so on through 178. Thus, as shown in dashed lines in processing channel 142a, a reciprocal network 194 (one only being shown) may be included in the output circuit of each of processing channels 142a, b through n. In each case, the respective summation circuit 160, 174 through 182 will function in cooperation with the respective reciprocal network if employed for enabling second option output.

In operation, and referring to the two channel illustration of FIG. 4, a pair of seismic signals or traces $S_1(t)$ and $S_2(t)$ are passed through each of the delay units 50 and 52 to effect time delays equal to respective first and second dip scans No. 1 and No. 2. Such dip scan time delays are variable and set in accordance with ancillary information. The pairs of traces received from the delays 50 and 52 are then summed in respective summing networks 58 and 108 to produce summation output signals $S_s1$ and $S_s2$ on leads 60 and 110, respectively.

Each of the delayed signal outputs is utilized to derive a specific difference voltage which is then utilized in further processing of the summation signals $S_s1$ and $S_s2$. That is, signals S 1' and S 2' are each applied to difference networks 62 and 64 to derive their respective differences from the summation signal $S_s1$.

Similarly, difference networks 112 and 114 serve to derive differences as between summation signals $S_s2$ on lead 110 and each of the time-delayed output trace signals S 1" and S 2" on respective leads 104 and 106. Thus, there is derived from difference networks 62, 64 and 112 and 114 the two pairs of difference signals $(S_s1 - S1')$, $(S_s1 - S2')$ and $(S_s2 - S1'')$, $(S_s2 - S2'')$. Each of these signal values, which is equal to the difference between its respective time-delayed signal and its mean or summation signal, is then made absolute by passage through respective full-wave rectifiers 66, 68, 116 and 118 for input to the respective summing networks 74 and 120.

Thus, difference voltages respecting the $S_s1$ summation voltages are provided as output on lead 76 to comparator network 84 as a mean differential voltage $S_d1$ and, similarly, difference voltages relative to summation signal $S_s2$ are provided as output from summing network 120 as a mean differential voltage $S_d2$ on lead 122 for input to comparator network 122. The summed difference voltages $S_d1$ and $S_d2$ are then fed to a comparator switching network 84 which serves to switch the output voltage $S_s1$ to the output if $S_d1$ is equal to or smaller than $S_d2$, and it serves to switch $S_s2$ to the output if $S_d1$ is greater than $S_d2$.

As previously stated, an option switch 82 is provided so that the reciprocal of $S_d1$ or $S_d2$ can be applied to the output trace lead 102 as selected by the comparator network 84. Such second option functions to control the output gain of the summation signals $S_s1$ and $S_s2$ in accordance with the reciprocal function of their respective differential summation voltages $S_d1$ and $S_d2$. Thus, at times when there is less coherence for a given dip scan, i.e. a smaller value of $S_s1$ at any instant and, therefore, larger absolute value of $S_d1$, there will result a higher order reciprocal or lesser value multiplier to the output summation signal $S_s1$. That is, $S_s1$ will not necessarily be indicative of any coherence and the accompanying multiplication factor will be maintained at a minimum to render little or no accentuation.

The system 140 of FIG. 5 is merely one form of analog equipment which may be utilized for processing of a large number of input seismic trace signals $S(t)_1$ through $S(t)_n$. Each of the processing channels 142a through 142n will perform essentially the same function as the individual channels 42 and 44 of coherence stacking circuitry 40 (FIG. 4). In this case, the comparator circuitry 154 may be required to be of a much more elaborate nature, as it may even be a multistage logic circuitry capable of receiving all summation trace signal inputs and selecting a single trace value for conduction to output device 192. Such circuitry is, of course, well-known and readily available to the skilled artisan in the geophysical field.

It should be understood that the present invention or coherence stacking procedure and systems may be employed in combination with various other forms of seismic signal processing system to develop whatever the desired interpretative information. In addition, frequency filtering of whatever nature may be applied at any point in the processing operation. While the specific systems disclosed therein tend to define the coherence stacking process to a large degree in terms of a mean differential summation signal treatment, it is contemplated that various other signal differentiating procedures may be employed in isolating the coherence of dipping events for compilation as output information. It is readily apparent too, that various forms of digital as well as analog equipment may be employed in carrying out the essential method disclosed herein.

The foregoing discloses a novel method and apparatus for processing multi-trace seismic signal energy such that dip coherence factors are stressed. The method develops energy values in the nature of dipping event coherence factors indicative of the degree of event simultaneity for selected time line-ups of related plural trace information. While the process is particularly adapted for use with common depth-point seismic data, there are various other compilations of seismic data which may be utilized in combination with the present invention.

Changes may be made in the combination and arrangement of steps or elements as heretofore set forth in the specification and shown in the drawings; it being understood that changes may be made in the embodiments disclosed without departing from the spirit and scope of the invention.

What is claimed is:

1. A method for seismic signal processing of plural seismic trace inputs to emphasize dipping events having greatest coherence, comprising the steps of:

varying the time relationship of the plural trace inputs by a selected first time delay per trace to produce first time displaced trace signals;

combining the first time displaced trace signals into a first combined signal having an amplitude which is an indication of event coherence at said first time delay per trace;

varying the time relationship of the plural trace inputs by a selected second time delay per trace to produce second time displaced trace signals;

combining the second time displaced trace signals into a second combined signal having an amplitude which is an indication of event coherence at said second time delay per trace; and continually selecting the one of said first or second combined signals having greatest amplitude for application as the instantaneous output signal to produce an output indication which is indicative of dipping events having greater than selected coherence.

2. A method as set forth in claim 1 which is further characterized to include the steps of:

varying the time relationship of the plural trace inputs an additional plurality of times each by selected different time delays per trace to produce an additional plurality of differently time displaced trace signals;

combining the additional plurality of time displaced trace signals into an additional plurality of combined signals having an amplitude which is an indication of event coherence at said additional plurality of time delay per trace; and selecting the one of each of said additional pluralities of combined signals along with said first and second combined signals for application as the output signal which is indicative of dipping events having the greatest coherence.

3. A method as set forth in claim 1 wherein each of said steps of combining comprise:

deriving a summation signal of all of said respective time displaced trace signals which summation signal is also applied as said combined signal to said selecting step;

deriving a plurality of difference signals as between each of said time displaced trace signals and said summation signal; and combining said difference signals for application to said step of selecting.

4. A method as set forth in claim 2 wherein each of said steps of combining comprise:

deriving a summation signal of all of said respective time displaced trace signals which summation signal is also applied as said combined signal to said selecting step;

deriving a plurality of difference signals as between each of said time displaced trace signals and said summation signal; and combining said difference signals for application to said step of selecting.

5. A method as set forth in claim 1 wherein each of said steps of combining comprise:

deriving a summation signal from all of said respective time displaced trace signals;

deriving a plurality of difference signals as between each of said time displaced trace signals and the derived summation signal;

combining the plurality of difference signals to derive a gain control output; and varying the summation signal output in accordance with said gain control output for subsequent application as the combined signal is said step of selecting.

6. A method as set forth in claim 2 wherein each of said steps of combining comprise:

deriving a summation signal from all of said respective time displaced trace signals;

deriving a plurality of difference signals as between each of said time displaced trace signals and the derived summation signal;

combining the plurality of difference signals to derive a gain control output; and varying the summation signal output in accordance with said gain control output for subsequent application as the combined signal in said step of selecting.

7. A method as set forth in claim 5 which is further characterized to include the steps of:

deriving a reciprocal signal value for said combined difference signal output for further output as said gain control.

8. A method as set forth in claim 6 which is further characterized to include:

deriving a reciprocal signal value for said combined difference signal output for further output as said gain control output.

9. A method for processing plural seismic trace inputs in order emphasize dipping events having greatest coherence, comprising the steps of:

processing the plural trace inputs to provide a plurality of parallel groups of plural trace outputs, each group having a different time delay per trace which is consonant with event dip parameters;

combining plural trace outputs from each of the plurality of trace groups to provide a plurality of combined signals having an amplitude which is an indication of event coherence at the respective time delay per trace;

deriving plural difference signals for each of the trace groups which difference signal is the difference between each of the respective time-delayed plural trace outputs and the respective group combined signal;

combining said plural difference signals from each trace group to produce a gain control signal; and comparing said plurality of group gain control signals to derive a determination as to which one of the output combined signals is applied as an output indication of greatest coherence.

10. A method as set forth in claim 9 which is further characterized in that:

each of said group gain control signals is derived as a reciprocal of the sum of the absolute values of said groups of plural difference signals; and the gain of said group combined signals is controlled in proportion to the reciprocal gain control signal of the respective group.

11. A method as set forth in claim 9 which is further characterized in that:

said step of combining plural trace outputs consists of algebraically summing said trace outputs.

12. A method as set forth in claim 9 which is further characterized in that:

said step of combining said plural difference signals consists of arithmetically summing said difference signals.

* * * * *